UNITED STATES PATENT OFFICE.

JOHN BOYD, OF ELMHURST, ILLINOIS.

PROCESS OF CHEESE-MAKING.

SPECIFICATION forming part of Letters Patent No. 494,777, dated April 4, 1893.

Application filed May 23, 1892. Serial No. 433,994. (No specimens.)

*To all whom it may concern:*

Be it known that I, JOHN BOYD, a citizen of the United States, residing at Elmhurst, in the county of Du Page and State of Illinois, have invented a new and useful Improvement in the Art or Process of Cheese-Making, of which the following is a specification.

My invention relates to the art of manufacturing cheese.

Heretofore in the manufacture of cheese, and especially of what is commonly known as full cream cheese, or cheese made from unskimmed milk, a very great loss has been experienced owing to the fact that a material percentage of the fatty matter in the milk is lost. The percentage of fat in the milk thus lost in practice varies ordinarily all the way from fifty per cent. down to four or five per cent. according to the skill and care with which the old cheese making processes are carried out. But so far as I am aware no means have heretofore been discovered whereby this loss could be reduced to much less than four per cent. of the total amount of fatty matter in the milk, with however great care and skill the cheese making process may be manipulated; and this loss has generally been estimated in the practical work of cheese factories at an average of from seven to ten per cent. Attempts have heretofore been made to utilize to some extent this lost or waste fatty matter in the whey or in the manufacture of the cheese by recovering and converting it into butter or cheese grease; but the butter so produced is of an inferior quality and of comparatively little value, as is also the cheese grease.

Another difficulty commonly experienced in the old processes of manufacturing cheese heretofore commonly in use is the lack of uniformity in the quality of the cheese made from the same vat of milk, the cheese made from some portions of the same curd being of much richer and better quality than that made from other portions thereof, which results in material loss to the manufacturer as the quality and price is often estimated from the poorer parts of the lot.

The object of my invention or discovery is to provide an efficient and adequate means for overcoming these difficulties or objections and producing a cheese of uniform quality and richness throughout the whole vat or curd, and whereby the percentage of fatty matter heretofore lost may be saved and evenly incorporated throughout the curd or cheese produced therefrom. I have discovered that this object or result may be accomplished, and at the same time a cheese of much finer flavor produced, by bringing the milk to a state of complete emulsion, (so that the fatty matter is thoroughly distributed throughout and incorporated with the milk in practically the same manner that it is when fresh drawn from the cow,) at the time or before the rennet is added. And I have further discovered that this bringing or restoring of the milk to a complete emulsion may be effected practically and economically by placing the milk in the condition that it ordinarily comes to the cheese factory when collected from the farms, in the cheese vat and then subjecting it to heat and agitation by swinging vertical coils of hot water pipe back and forth through the vat. By agitating the mass of milk by contact with moving coils of hot water pipe it is gradually heated, and, being simultaneously agitated, the more or less separated fatty matter is uniformly and thoroughly distributed throughout the mass of milk and brought into a state of complete emulsion therewith, approximating very closely the condition of the milk when it is fresh drawn from the cow. And when the rennet is now added, the temperature of the mass of milk being first brought to the required degree, or about 84° Fahrenheit, the milk is coagulated in this emulsified condition or state, and no portion, or, if any, a very unappreciable portion, of the fatty matter in the milk is permitted to escape in the whey. And when the curd is formed from the thus emulsified milk, the fatty matter remains evenly and uniformly distributed throughout the whole mass of the curd, so that the cheese made from different portions of the curd will be of uniform quality. And when the curd is cut, as the fatty matter is thus evenly and uniformly distributed throughout the whole mass of curd from bottom to top, no portion of the curd contains a greater proportion of fatty matter than it can hold, and consequently there is little or no tendency for the escape of the butter fat into the whey from the cutting of the curd. In the processes heretofore commonly in use as the butter fat is unevenly distributed and largely collected at the top portions of the curd, when the curd is cut a material portion of the butter fat follows the knife and escapes into the whey. And for the same reason when the curd made by my process is put into the press there is very little escape of butter fat from the curd owing to its even distribution throughout the mass.

In practicing my process the mechanism which I employ, or prefer to employ for simultaneously heating and agitating the milk is that shown and described in my pending application, Serial No. 422,560, filed February 22, 1892, but any other suitable form or construction of mechanism for heating and agitating the milk by contact with moving coils of hot water pipe may be employed. In practicing the process, the agitation of the milk by the movable coils of hot water pipe should be continued for a short time after the rennet is added, say about one minute, more or less, to insure the thorough distribution of the rennet throughout the mass of emulsified milk.

The cheese made by my process is of a much better and finer flavor than cheese made by the old processes heretofore in use. This I think is due to the fact that the portion of the fatty matter of the milk heretofore usually lost in the old processes is the part of the fatty matter which contains the greatest portion of the flavoring acids that give the fine flavor to butter and cheese. I have also found that by my process the quantity or weight of cheese produced is materially greater than the increase due alone to the quantity or weight of fatty matter saved. And this I think is due to the fact that by my process other constituents of the milk than the fatty matter heretofore lost are also saved.

It will be understood by those skilled in the art that it is the custom in cheese making to collect the milk from a number of farms or dairies within a radius of several miles and carry it to the cheese factory, this collection being made once in every twenty four hours. There is thus delivered to the cheese factory the milk of the previous afternoon or evening and the milk of the morning of the day of collection. The evening's milk by the time it reaches the cheese factory will be from twelve to twenty hours old, and as this milk has necessarily been cooled at the farm or dairy in order to keep it, the cream or fatty globules in it will have become largely separated from the serum of the milk. This is especially true in cold weather; and the separation of the cream and milk will also have taken place to a greater or less degree in respect to the morning's milk. By my process however this milk is brought back to a state of complete emulsion, and the cream or fatty globules thoroughly and evenly distributed throughout the entire mass and incorporated with the milk before the same is coagulated by the action of the rennet. After the milk thus collected, and in this state of more or less complete separation of the cream or fatty globules from the serum, has been treated by my process and brought back to what I have for convenience termed a state of complete emulsion, I have found by actual tests that the milk taken from different portions of the vat, from the top and from the bottom, is equally rich in fatty globules in every part; and to all appearances the milk seems to be fully restored to the original condition it was in when fresh drawn from the cow, excepting of course the escape of animal heat.

I claim—

1. The improvement in the art or process of manufacturing cheese from milk, wherein the cream or natural fatty globules of the milk are more or less separated from the serum, consisting in first bringing the milk and cream to a condition of complete emulsification by simultaneously heating and agitating it and then coagulating it while in this emulsified condition by the addition of rennet, whereby the loss or escape of said fatty matter is prevented, substantially as specified.

2. The improvement in the art or process of manufacturing cheese from milk wherein the natural fatty matter of the milk and serum thereof are more or less separated, consisting in first subjecting the milk and cream to heat and agitation until the milk is brought into a completely emulsified condition and the fatty matter evenly distributed throughout the mass and thoroughly incorporated with the milk and then after the temperature has been brought to the required degree adding the rennet and continuing the agitation for a short period thereafter to insure the distribution of the rennet throughout the mass and whereby the emulsified condition of the milk is maintained up to the point or time of its coagulation, whereby a curd is produced without the loss or escape of fatty matter of the milk and wherein the fatty matter is evenly distributed throughout the mass, substantially as specified.

JOHN BOYD.

Witnesses:
LEW. E. CURTIS,
EDMUND ADCOCK.